United States Patent
Cho et al.

(10) Patent No.: US 11,962,039 B2
(45) Date of Patent: Apr. 16, 2024

(54) MOUNTING METHOD OF BUS-BAR FRAME

(71) Applicant: LG Chem, Ltd., Seoul (KR)

(72) Inventors: Young Bum Cho, Daejeon (KR); Kyung Mo Kim, Daejeon (KR); Sung Won Seo, Daejeon (KR); Seung Joon Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 590 days.

(21) Appl. No.: 17/262,090

(22) PCT Filed: Aug. 19, 2019

(86) PCT No.: PCT/KR2019/010495
§ 371 (c)(1),
(2) Date: Jan. 21, 2021

(87) PCT Pub. No.: WO2020/075966
PCT Pub. Date: Apr. 16, 2020

(65) Prior Publication Data
US 2021/0288387 A1 Sep. 16, 2021

(30) Foreign Application Priority Data
Oct. 10, 2018 (KR) .................. 10-2018-0120748

(51) Int. Cl.
*H01M 50/507* (2021.01)
*H01M 50/211* (2021.01)
(Continued)

(52) U.S. Cl.
CPC ....... *H01M 50/507* (2021.01); *H01M 50/211* (2021.01); *H01M 50/242* (2021.01);
(Continued)

(58) Field of Classification Search
CPC .. H01M 50/507; H01M 50/50; H01M 50/538; H01M 50/242; H01M 50/533; H01M 50/211; H01M 50/271
(Continued)

(56) References Cited

U.S. PATENT DOCUMENTS 10,014,507 B2   7/2018  Tsuruta et al.
2005/0123828 A1  6/2005  Oogami et al.
(Continued)

FOREIGN PATENT DOCUMENTS

CN   1619858 A    5/2005
CN   107925028 A  4/2018
(Continued)

OTHER PUBLICATIONS

Extended European Search Report including Written Opinion for Application No. 19871665.6 dated Jul. 7, 2021, pp. 1-10.
(Continued)

*Primary Examiner* — Jonathan G Jelsma
*Assistant Examiner* — Omar M Kekia
(74) *Attorney, Agent, or Firm* — Lerner David LLP

(57) ABSTRACT

A method of mounting a bus-bar frame includes: forming a plurality of cell lead blocks and a battery cell stacked body by alternately stacking a cell lead block and at least one battery cell; disposing a top cover with respective ends on which a bus-bar frame is installed so as to cover the battery cell stacked body; removing the lead blocks from a space between the battery cell stacked body and the bus-bar frame; and installing the bus-bar frame on the battery cell stacked body by rotating the bus-bar frame. The alternately stacking of the cell lead block and the at least one battery cell includes positioning an electrode lead protruding from each battery cell between neighboring ones of the cell lead blocks.

10 Claims, 13 Drawing Sheets

(51) Int. Cl.
- *H01M 50/242* (2021.01)
- *H01M 50/271* (2021.01)
- *H01M 50/50* (2021.01)
- *H01M 50/533* (2021.01)
- *H01M 50/538* (2021.01)

(52) U.S. Cl.
CPC ......... *H01M 50/271* (2021.01); *H01M 50/50* (2021.01); *H01M 50/533* (2021.01); *H01M 50/538* (2021.01)

(58) Field of Classification Search
USPC ........................................................ 429/156
See application file for complete search history.

(56) References Cited

U.S. PATENT DOCUMENTS

| | | |
|---|---|---|
| 2013/0189563 A1 | 7/2013 | Chang et al. |
| 2015/0017504 A1 | 1/2015 | Isshiki et al. |
| 2015/0132622 A1* | 5/2015 | Gohl ................. H01M 50/569 429/90 |
| 2018/0151859 A1 | 5/2018 | Aizawa |
| 2019/0001838 A1 | 1/2019 | Choi et al. |
| 2019/0348720 A1 | 11/2019 | Oh et al. |
| 2019/0372079 A1* | 12/2019 | Nakamoto ........... H01M 50/50 |
| 2019/0389318 A1 | 12/2019 | Lee et al. |
| 2020/0014005 A1 | 1/2020 | Lee et al. |
| 2020/0189400 A1 | 6/2020 | Kim et al. |

FOREIGN PATENT DOCUMENTS

| | | |
|---|---|---|
| CN | 108448041 A | 8/2018 |
| CN | 108463902 A | 8/2018 |
| EP | 1530247 A2 | 5/2005 |
| EP | 3367468 A1 | 8/2018 |
| GB | 2535546 A | 8/2016 |
| JP | H07263029 A | 10/1995 |
| JP | 2005116433 A | 4/2005 |
| JP | 2005116436 A | 4/2005 |
| JP | 2008147047 A | 6/2008 |
| JP | 2016033905 A | 3/2016 |
| JP | 2020509545 A | 3/2020 |
| KR | 100645855 B1 | 11/2006 |
| KR | 101023184 B1 | 3/2011 |
| KR | 20110112082 A | 10/2011 |
| KR | 20160004661 A | 1/2016 |
| KR | 20170103232 A | 9/2017 |
| KR | 20170135476 A | 12/2017 |
| KR | 20180099438 A | 9/2018 |
| WO | 2013145917 A1 | 10/2013 |
| WO | 2017006763 A1 | 1/2017 |
| WO | 2018124494 A2 | 7/2018 |

OTHER PUBLICATIONS

International Search report for Application No. PCT/KR2019/010495, dated Dec. 11, 2019, 2 pages.
Search Report dated Jun. 22, 2022 from the Office Action for Chinese Application No. 2019800437847 dated Jun. 29, 2022, 4 pgs.

* cited by examiner

MOUNTING METHOD OF BUS-BAR FRAME

CROSS-REFERENCE TO RELATED APPLICATION

This application is a national phase entry under 35 U.S.C. § 371 of International Application No. PCT/KR2019/010495 filed Aug. 19, 2019, which claims priority from Korean Patent Application No. 10-2018-0120748 filed on Oct. 10, 2018, the entire contents of which are incorporated herein by reference.

BACKGROUND OF THE INVENTION

(a) Field of the Invention

The present invention relates to a method for assembling a bus-bar frame, and in particular, it relates to a method for assembling a bus-bar frame using a block in a cell lead shape.

(b) Description of the Related Art

Rechargeable batteries having high application characteristics and electrical characteristics such as high energy density according to their products are widely applied to battery vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit, that they can drastically reduce the use of fossil fuels.

The battery pack applied to the battery vehicle has a structure in which a plurality of cell assemblies including a plurality of unit cells are coupled in series to obtain high power. The unit cell can be repeatedly charged and discharged by electrochemical reaction between constituent elements, including positive and negative current collectors, separators, active materials, and electrolyte solutions.

Meanwhile, as the need for a large capacity structure increases, including the use of energy storage sources, a demand for battery packs having a multi-module structure in which a plurality of rechargeable batteries formed by assembling a plurality of battery modules coupled in series and/or in parallel with each other has increased.

In general, when a battery pack is formed by coupling a plurality of battery cells in series/in parallel, a battery module formed of at least one battery cell is formed first, and other constituent elements are added to the at least one battery module, thereby forming a battery pack.

The conventional battery module is configured to include a plurality of battery cells that are mutually stacked, and a bus-bar assembly for electrically connecting electrode leads of the battery cells. Here, the bus-bar assembly includes a bus-bar frame including lead slots for respectively transmitting electrode leads of the respective battery cells, and bus-bar slots mounted on the bus-bar frame and provided corresponding to a number of lead slots, and it is configured to include a bus bar connected to the electrode leads passing through the bus-bar slots by welding.

However, regarding the battery module, when the number of battery cells increases, the number of electrode leads increases by as many as the same number, the number of lead slots increases according to the number of electrode leads, and a width of the lead slot reduces in the bus-bar frame in accordance with an increase in the number of lead slots, so a short circuit may be generated among the neighboring electrode leads.

FIG. 1 shows a bus-bar frame in a conventional battery module.

Referring to FIG. 1, the above-noted short circuit among the electrode leads 40 may be prevented by attaching an additional insulation tape 60. However, after the bus-bar frame 50 is assembled, the insulation tape 60 must be removed so as to weld the electrode leads 40, and the bus-bar frame 50 must be manually assembled to the battery cells 10 because of complexity of the shape of the cell terrace 30, so efficiency of the assembling process is deteriorated, for example, a misassembling probability increases. Therefore, a method for improving efficiency of the assembling process when the bus-bar frame is assembled to the battery cell in the battery module is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for assembling a bus-bar frame for improving efficiency of an assembling process when a bus-bar assembly is assembled.

However, tasks to be solved by exemplary embodiments of the present invention may not be limited to the above-described task, and may be extended in various ways within a range of technical scopes included in the present invention.

An exemplary embodiment of the present invention provides a mounting method of a bus-bar frame, including: forming a plurality of cell lead blocks and a battery cell stacked body by alternately stacking a cell lead block and at least one battery cell; disposing a top cover with respective ends on which a bus-bar frame is installed so as to cover the battery cell stacked body; removing the lead blocks from a space between the battery cell stacked body and the bus-bar frame; and installing the bus-bar frame to be installed on the battery cell stacked body by rotating the bus-bar frame, wherein the alternately stacking of a cell lead block and at least one battery cell includes providing an electrode lead protruding from the battery cell between cell lead blocks neighboring each other from among the lead blocks.

Respective electrode leads of the battery cells may form a cell terrace in which gaps between the electrode leads reduce in a direction in which the electrode leads protrude, and a shape of the cell terrace may be realized by a shape of the cell lead block.

An impregnation structure may be formed on one side of the cell lead block facing the cell terrace, and the cell terrace may be disposed in the impregnation structure.

The mounting method may further include rotating the bus-bar frame in a range of an acute angle before the removing of the cell lead blocks.

In the mounting of the bus-bar frame on the battery cell stacked body, the electrode lead may be inserted into a lead slot formed in the bus-bar frame.

The electrode lead may be formed for the respective lead blocks so it becomes plural, and the electrode leads neighboring each other with respect to the cell lead block may be stacked to have different polarity disposals.

The electrode leads may extend between the cell lead blocks neighboring each other from among the lead blocks to form an electrode lead group.

The forming of the lead blocks and the battery cell stacked body includes mounting the lead blocks on respective ends of a compression pad and forming the battery cell stacked body on the compression pad.

The mounting method may further include additionally forming the compression pad on an uppermost battery cell included in the battery cell stacked body.

The mounting method may further include additionally forming the compression pad in the middle of stacking the battery cell.

According to the exemplary embodiments, by using the block in a cell lead shape, a short circuit among the electrode leads with different polarities is prevented when the battery cells are stacked, and an automated method for assembling a bus-bar frame may be realized.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

Figure 1:
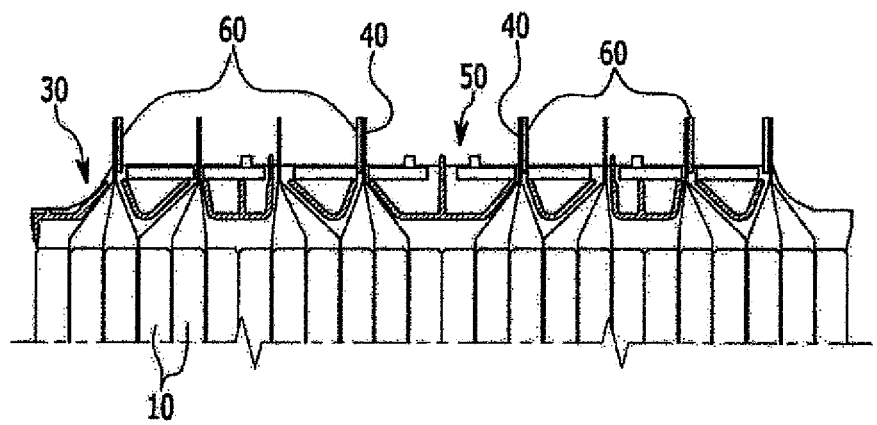
FIG. 1 shows a bus-bar frame in a conventional battery module.
Figure 2:
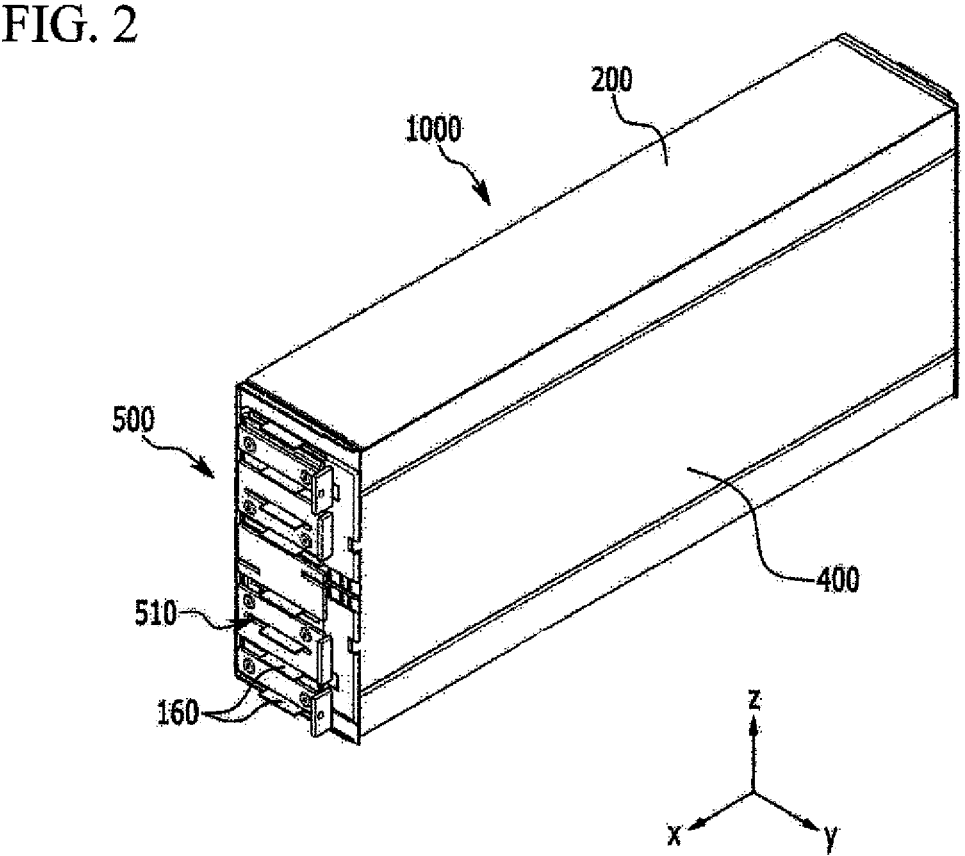
FIG. 2 shows a perspective view of a battery module according to an exemplary embodiment of the present invention.
Figure 3:
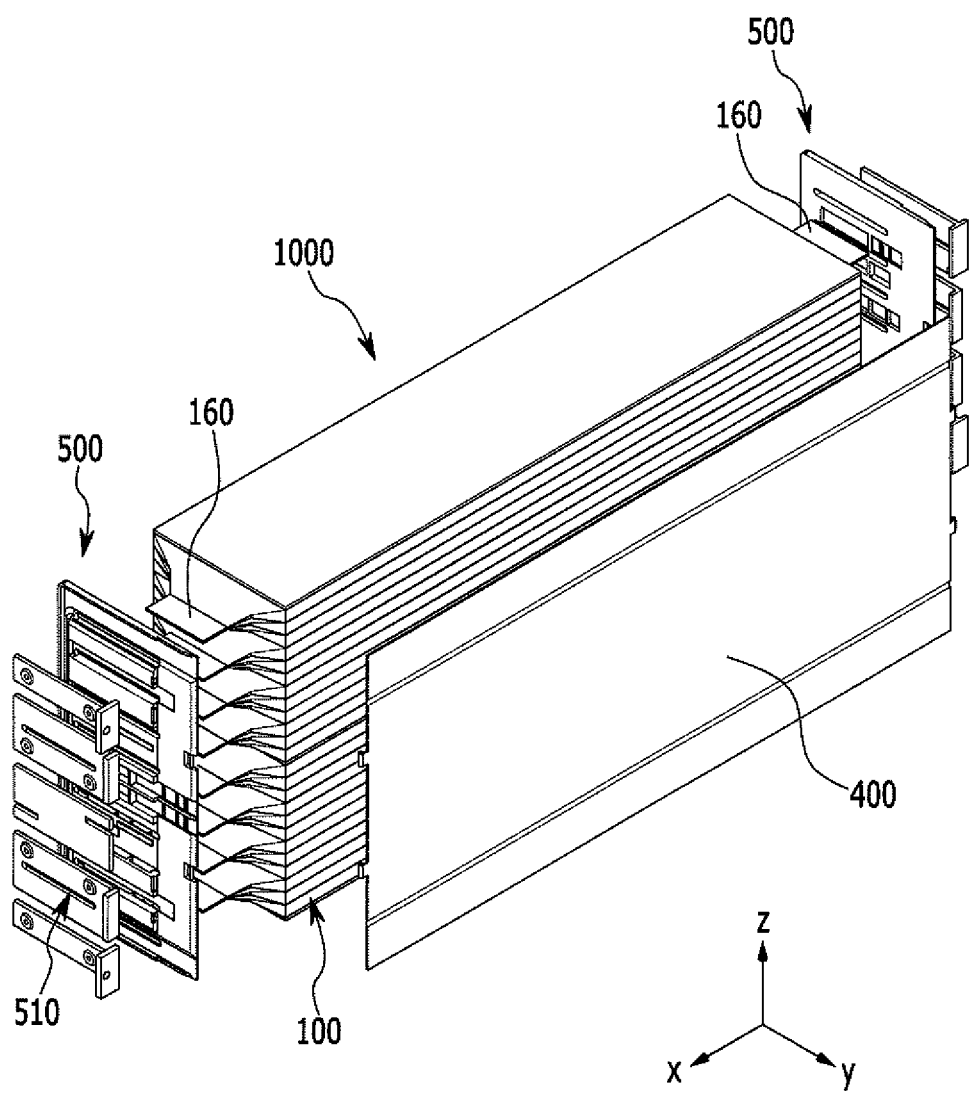
FIG. 3 shows an exploded perspective view of a plurality of battery cells and a bus-bar frame included in a battery module of FIG. 2.
Figure 4:
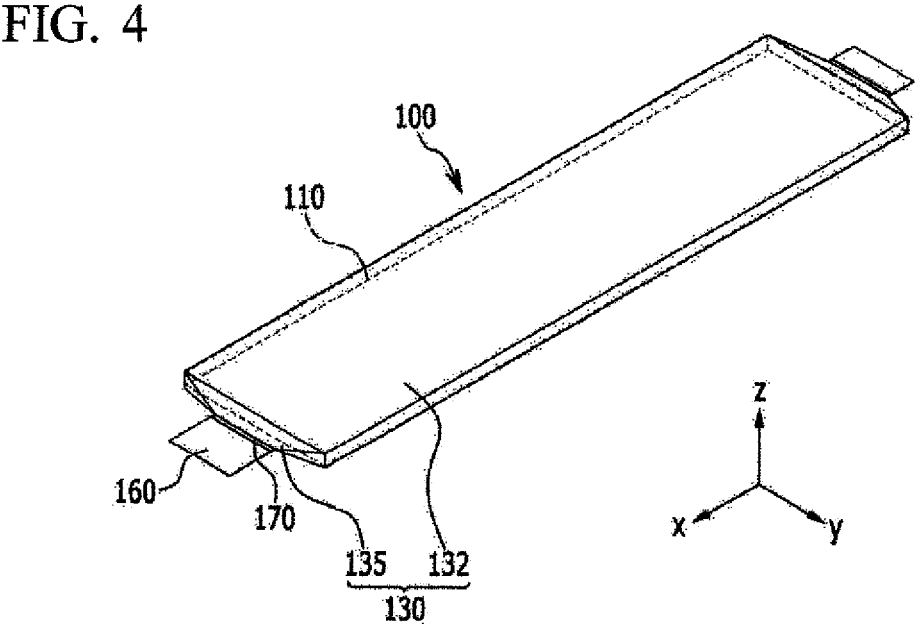
FIG. 4 shows a perspective view of a battery cell included in a battery module of FIG. 3.

FIG. 2 shows a perspective view of a battery module according to an exemplary embodiment of the present invention. FIG. 3 shows an exploded perspective view of a plurality of battery cells and a bus-bar frame included in a battery module of FIG. 2. FIG. 4 shows a perspective view of a battery cell included in a battery module of FIG. 3.

Referring to FIG. 2 and FIG. 3, the battery module 1000 according to the present exemplary embodiment includes a plurality of battery cells 100 and a bus-bar frame 500. The battery module 1000 includes a top cover 400 for covering a plurality of battery cells stacked bodies, and a bus-bar frame 500 is mounted on respective ends of the top cover 400. A compression pad 200 may be provided on an external side of the battery cell stacked body formed by stacking a plurality of battery cells 100. Electrode tabs (not shown) protruding from a plurality of battery cells 100 extend to be connected to an electrode lead 160, and the electrode lead 160 may pass through a lead slot 510 formed in the bus-bar frame 500.

A configuration of one battery cell 100 will now be described with reference to FIG. 4.

The battery cell 100 may be configured to be a pouch-type rechargeable battery. The battery cell 100 may be plural, and a plurality of battery cells 100 may be stacked to form a battery cell stacked body so that they may be electrically connected to each other.

The battery cells 100 may include an electrode assembly 110, a battery case 130, an electrode lead 160 protruding from the electrode assembly 110, and an insulation tape 170.

The electrode assembly 110 may be configured with a positive electrode plate, a negative electrode plate, and a separator. The battery case 130 packages the electrode assembly 110, and it may be configured of a laminate sheet including a resin layer and a metal layer. The battery case 130 may include a case main body 132 and a cell terrace 135.

The case main body 132 may receive the electrode assembly 110. For this purpose, the case main body 132 includes a space for receiving the electrode assembly 110. The cell terrace 135 may extend from the case main body 132, and may be sealed to seal the electrode assembly 110. Part of the electrode lead 160 may protrude on one side of the cell terrace 135, specifically, on a front side (+X-axis direction) of the cell terrace 135.

The electrode lead 160 may be electrically connected to the electrode assembly 110. A pair of the electrode leads 160 may be provided. The one pair of electrode leads 160 may respectively protrude outside the cell terrace 135 in the front side (+X-axis direction) and the rear side (−X-axis direction) of the battery case 130.

The insulation tape 170 may prevent generation of a short circuit between the battery case 130 and the electrode lead 160, and may improve a sealing force of the cell terrace 135.

The insulation tape 170 may be provided to correspond to a number of the electrode leads 160. Accordingly, one pair of the insulation tapes 170 may be provided. The one pair of insulation tapes 170 may respectively protrude outside the cell terrace 135 in the front side (+X-axis direction) and the rear side (−X-axis direction) of the battery case 130.

The above-described configuration of the battery cell 100 is one example, and shapes of the battery cell 100 for configuring the battery cell stacked body may be changed in various ways.

Referring to FIG. 2 and FIG. 3, although not shown, the bus-bar frame 500 is included in the bus-bar assembly, and the bus-bar assembly may cover a plurality of battery cells 100 so as to electrically connect the electrode leads 160 of a plurality of battery cells 100. The bus-bar assembly may cover a plurality of battery cells 100 in the protruding direction (X-axis direction) of the electrode leads 160.

One pair of the bus-bar assemblies may be provided. The one pair of bus-bar assemblies may cover a plurality of battery cells 100 so as to electrically connect the electrode leads 160 protruding in the front side (+X-axis direction) of a plurality of battery cells 100 and the electrode leads 160 protruding in the rear side (−X-axis direction) of a plurality of battery cells 100.

The one pair of bus-bar assemblies may include a bus-bar (not shown) and a cell connecting board (not shown) in addition to the bus-bar frame 500.

The bus-bar frame 500 may cover the front side (+X-axis direction) or the rear side (−X-axis direction) of a plurality of battery cells 100. For this purpose, the bus-bar frame 500 may be provided to have an area that corresponds to the front side (+X-axis direction) or the rear side (−X-axis direction) of a plurality of battery cells 100.

The lead slot 510 transmits the electrode leads 160 of a plurality of battery cells 100, and it may be formed in the left to right direction (Y-axis direction) of the bus-bar frame 500.

The lead slot 510 may transmit extensions of the electrode leads 160 of the three adjacent battery cells 100 in common. That is, in the present exemplary embodiment, the electrode leads 160 of the three battery cells 100 neighboring each other may extend to form one electrode lead 160 group, and the electrode leads 160 included in the electrode lead 160 group may pass through the lead slot 510 and may be electrically connected to the bus bar through laser welding. The lead slots 510 neighboring each other may allow the electrode leads 160 with different polarities to pass through. In other words, one of the lead slots 510 neighboring each other passes through positive electrode leads 160, the other of the lead slots 510 neighboring each other may allow negative electrode leads 160 to pass through.

There may be multiple lead slots 510, and a plurality of lead slots 510 may be disposed to be separated from each other by a predetermined distance in a top-to bottom direction (Z-axis direction) of the bus-bar frame 500.

A method for assembling a bus-bar frame according to an exemplary embodiment of the present invention will now be described with reference to FIG. 5 to FIG. 16.

FIG. 5 to FIG. 16 show a method for assembling a bus-bar frame according to an exemplary embodiment of the present invention.

Figure 5:
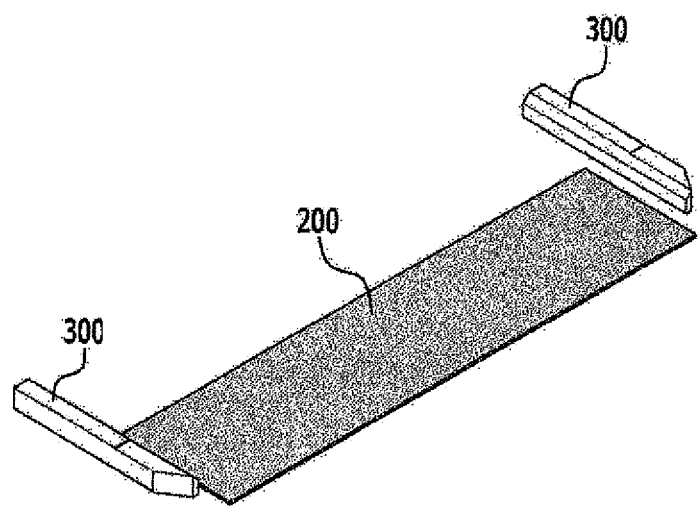
FIG. 5 to FIG. 14 show a method for assembling a bus-bar frame according to an exemplary embodiment of the present invention.

Referring to FIG. 5, a compression pad 200 is prepared, and a first cell lead block 300 is mounted on respective ends of the compression pad 200. The compression pad 200 may be formed by using a polyurethane-based material. The compression pad 200 may absorb changes of thickness caused by swelling of the battery cell 100 and changes of the battery cell 100 caused by external impacts.

The cell lead block 300 may be formed of an insulating material so as to prevent a short circuit between the positive electrode lead and the negative electrode lead neighboring each other. For example, the cell lead block 300 may use a PEEK material.

Figure 6:
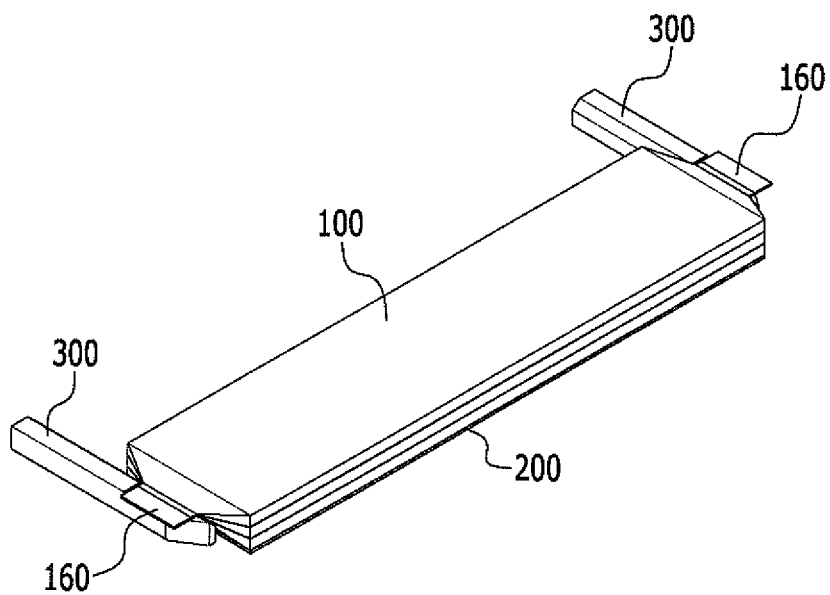

Referring to FIG. 6, battery cells 100 may be sequentially stacked on the compression pad 200. In this instance, two groups of electrode leads 160 may be formed by positioning the electrode leads 160 protruding from each end of the battery cells 100 shown in FIG. 4 on a respective one of the cell lead blocks 300 on the respective ends of the compression pad 200. Here, each electrode lead 160 group may be formed by extending the electrode leads 160 protruding from a respective end of the three battery cells 100. Each group of electrode leads 160 may be disposed in the form of electrode leads 160 with different polarities on the respective ends of the compression pad 200. It has been described in the present exemplary embodiment that the electrode leads 160 protruding from one end of the three battery cells 100 extend to form one electrode lead 160 group, which is an example, and a connection relationship of the battery cells 100 may be modified in various ways according to the arrangement of the battery cell 100 connected to the positive lead and the negative lead. Therefore, the number of battery cells 100 from which the electrode leads 160 for configuring one electrode lead 160 group extends is not limited and it may be changeable in various ways.

Figure 7:
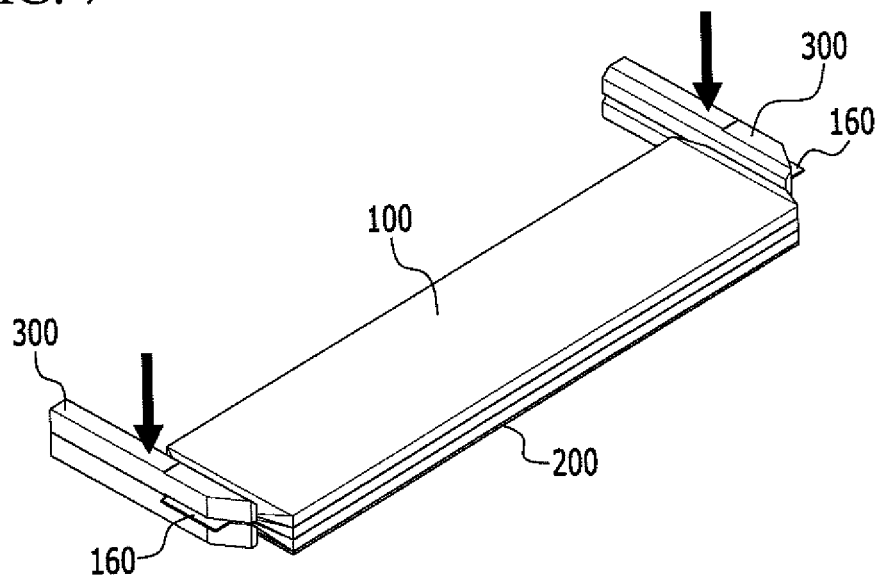

Referring to FIG. 7, a second cell lead block 300 is installed in respective ends of the compression pad 200. The second cell lead block 300 is installed so that it may be disposed over the electrode lead 160 group. In this instance, the electrode lead 160 group may be provided between the first cell lead block 300 and the second cell lead block 300 neighboring each other.

Figure 8:
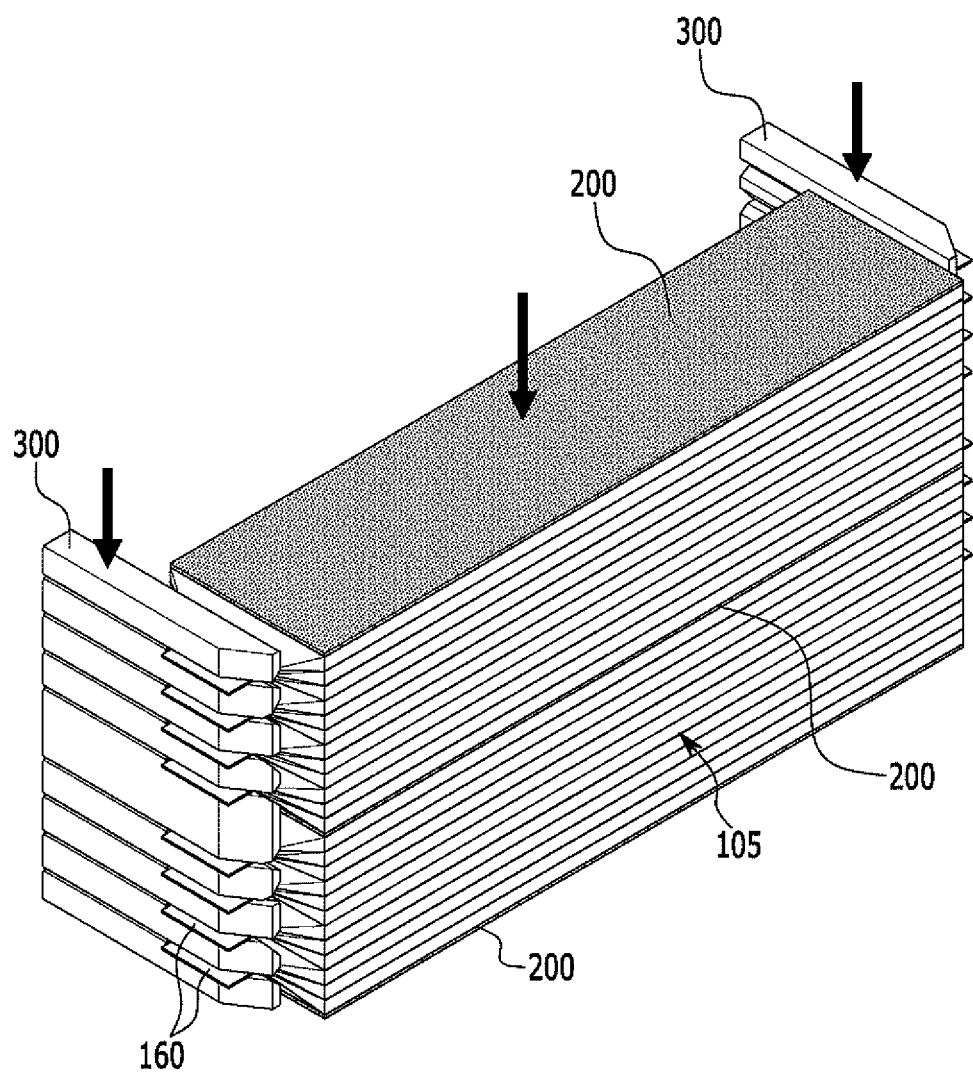

Referring to FIG. 8, battery cells 100 may be sequentially stacked on the previously stacked battery cells 100. In this instance, the battery cells 100 may be stacked so that they may have a polarity arrangement that is different from the polarity arrangement of the one group of a pair of electrode leads 160 provided between the first cell lead block 300 and the second cell lead block 300 described with reference to FIG. 6 and FIG. 7. In other words, when the polarity arrangement of the group of one pair of electrode leads 160 provided between the first cell lead block 300 and the second cell lead block 300 is positive and negative, the polarity arrangement of the group of one pair of electrode leads 160 possessed by the battery cells 100 stacked in the present stage may be negative and positive. That is, the positive electrode lead 160 group and the negative electrode lead 160 group may overlap each other.

As described, the battery cell stacked body 105 may be formed by stacking twenty-four battery cells 100 by repeating the process for sequentially stacking the cell lead blocks 300 and the battery cells 100, and in this instance, nine cell lead blocks 300 are usable. The number of the battery cells 100 and the number of the cell lead blocks 300 correspond to one example, and they may be changed in various ways in consideration of performance and designs of the battery module to be manufactured.

After the battery cell stacked body 105 is formed, a compression pad 200 may be additionally formed on the finally stacked battery cell 100. Further, to increase an external impact preventing effect, a compression pad 200 may be further formed on a center portion of the battery cell stacked body 105. The compression pad 200 may be formed by using a polyurethane-based material. The compression pad 200 may absorb changes of thickness caused by a swelling of the battery cell 100 and changes of the battery cell 100 caused by external impacts.

In another way, instead of using the compression pad 200, a plurality of cell lead blocks and a battery cell stacked body 105 may be formed by alternately stacking the cell lead block 300 and at least one battery cell 100.

Figure 9:
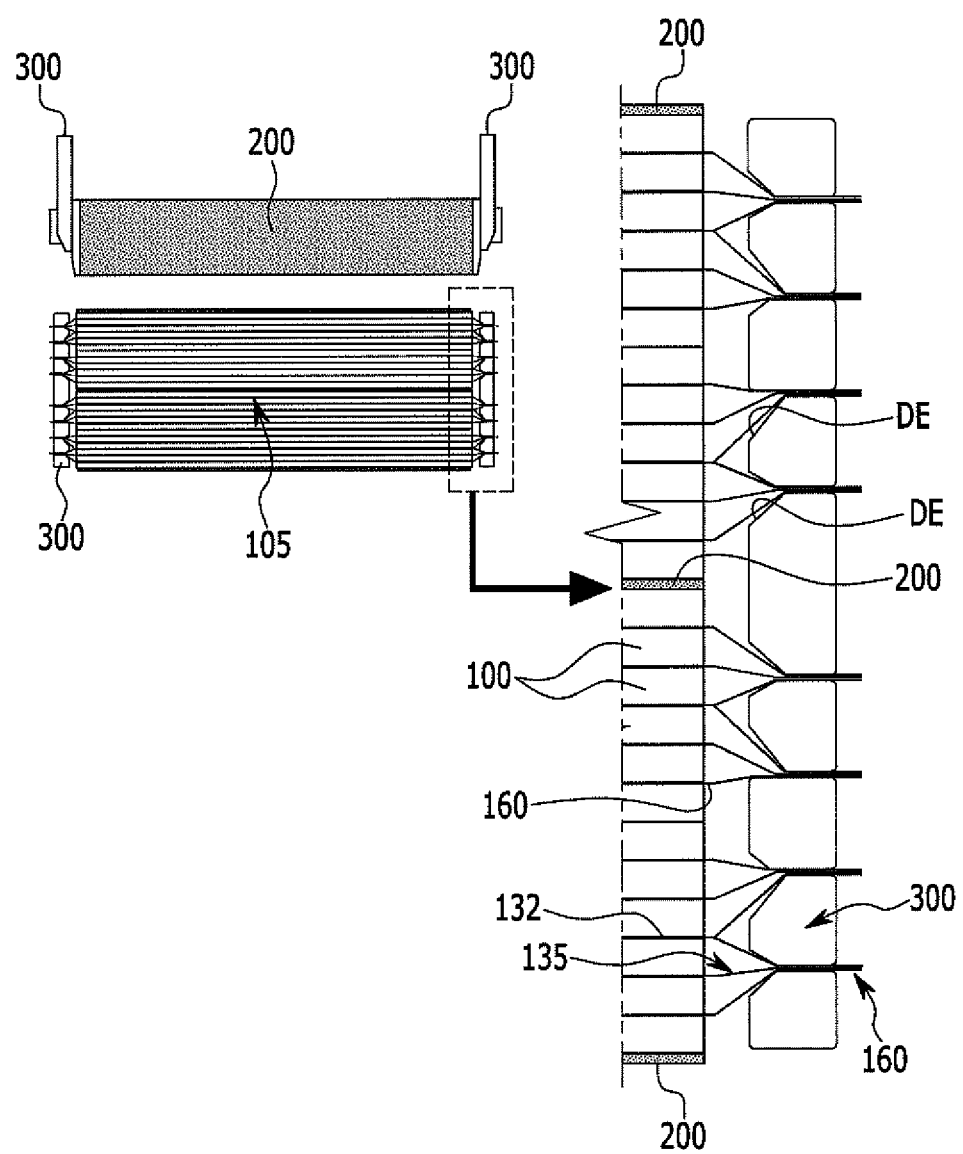

A configuration in which a cell lead block 300 is installed in the battery cell stacked body 105 will now be described in detail with reference to FIG. 9. In FIG. 9, the top left drawing represents a top plan view on the configuration in which the cell lead block 300 is installed in the battery cell stacked body 105, the bottom left drawing represents a front view on the configuration, and the right drawing represents an enlarged portion of the front view.

Referring to FIG. 9, a cell terrace 135 in which gaps of electrode leads 160 of a plurality of respective battery cells 100 reduce in the protruding direction is formed. The cell terrace 135 may be a portion where the battery case main body 132 extends. An impregnation structure (DE) is formed on one side of the cell lead block 300 facing the cell terrace 135. A shape of the cell terrace 135 may be generated by the impregnation structure (DE). That is, as the cell terrace 135 is disposed on the impregnation structure (DE), the shape of the cell terrace 135 may be realized by the shape of the cell lead block 300.

When the electrode lead 160 becomes distant from the battery cell 100 in the protruding direction, a gap of the cell terrace 135 reduces, and a plurality of electrode leads 160 resultantly contact each other to form the electrode lead 160 group.

Figure 10:
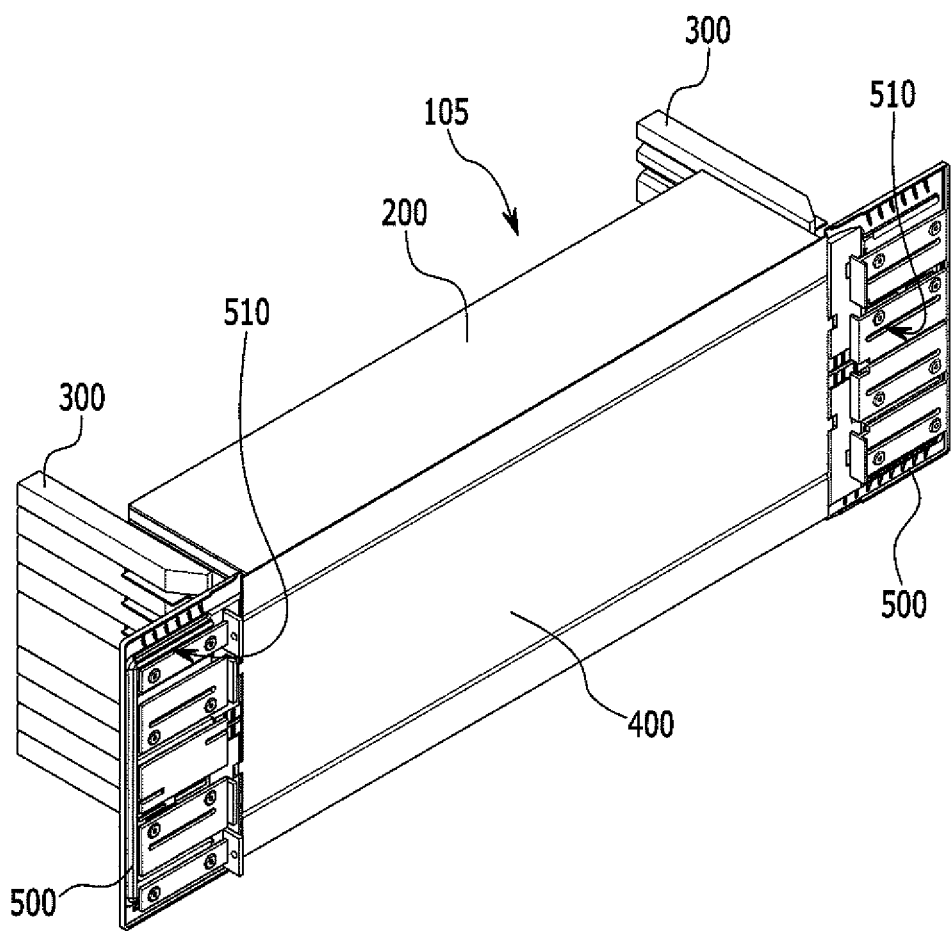
Figure 15:
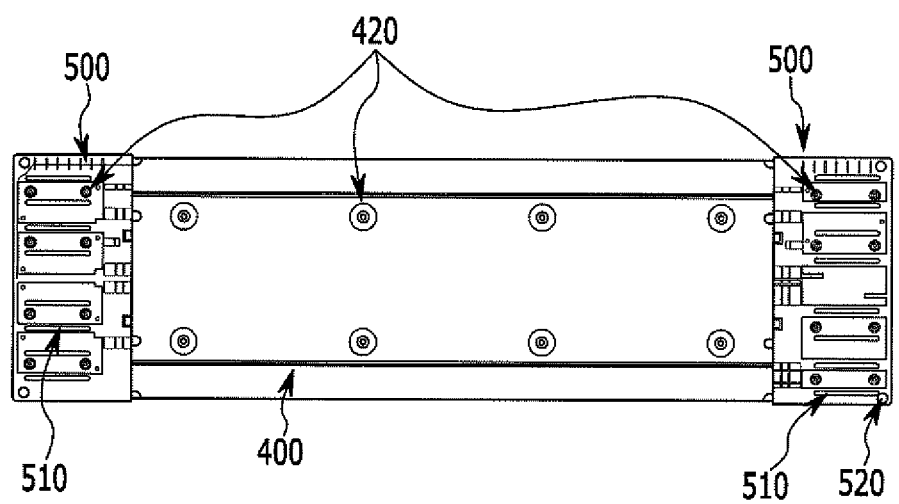
FIG. 15 shows a top plan view of a bus-bar frame according to an exemplary embodiment of the present invention.

Referring to FIG. 10, a top cover 400 with respective ends on which the bus-bar frame 500 is installed may be disposed on the battery cell stacked body 105. When the top cover 400 is positioned, the process for stacking the battery cell 100 and the installation of the bus-bar frame may be combined by attaching the top cover 400 to the battery cell stacked body 105 by use of a Cartesian robot and a pneumatic cylinder. As shown in FIG. 15, an adsorption pad 420 is formed on the top cover 400, and a plurality of lead slots 510 and rotary bars 520 are formed on the bus-bar frame 500. The rotary bars 520 may be provided on respective corners of the bus-bar frame 500. The adsorption pad 420 is a part for moving the bus-bar frame 500 and the top cover 400 to the battery cell stacked body 105 in a pneumatic way, and a plurality of adsorption pads 420 may be simultaneously attached to the bus-bar frame 500 and the top cover 400. The rotary bar 520 rotates the bus-bar frame 500 so that the bus-bar frame 500 may be mounted on the battery cell stacked body 105. In this instance, to rotate the bus-bar frame 500, air of the adsorption pad 420 attached to the bus-bar frame 500 may be removed.

Figure 11:
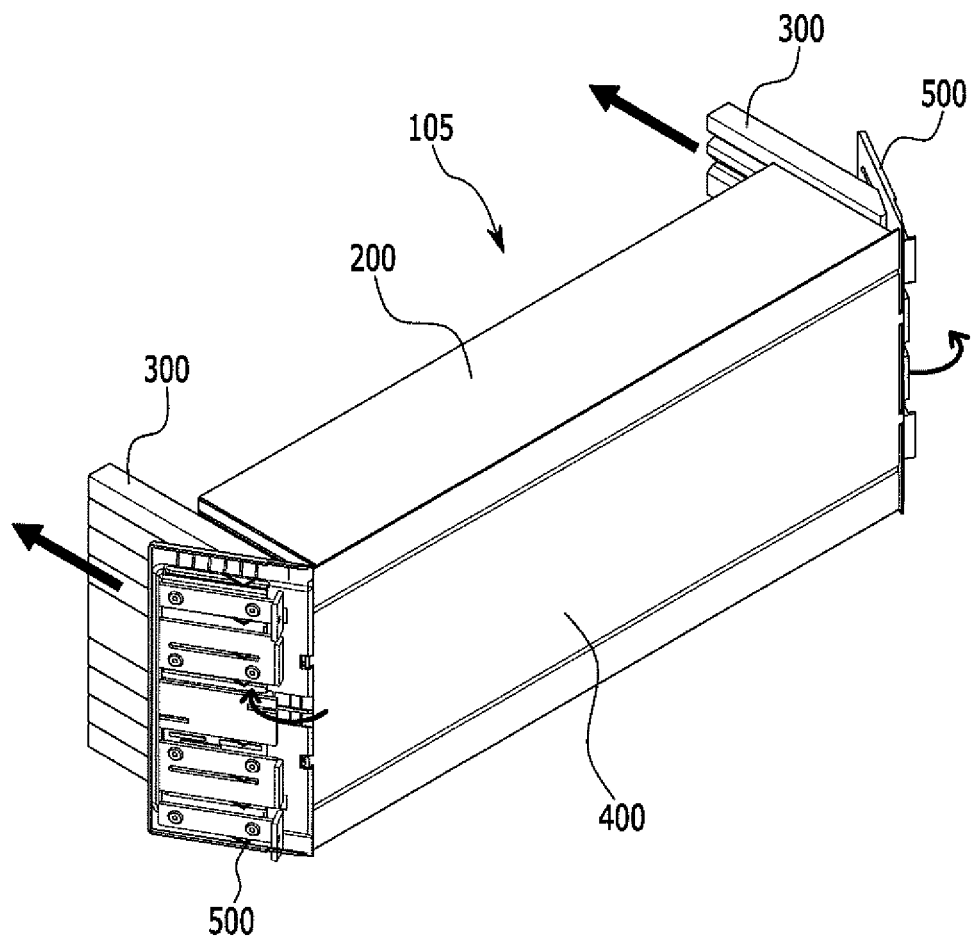

Referring to FIG. 11, the bus-bar frame 500 may be rotated in a range of an acute angle so that it may be provided near the cell lead block 300. The range of the acute angle may be 30 degrees to 60 degrees. In this instance, an end of the electrode lead 160 may be partly inserted into the lead slot 510 of the bus-bar frame 500 rotated in the range of an acute angle.

Figure 12:
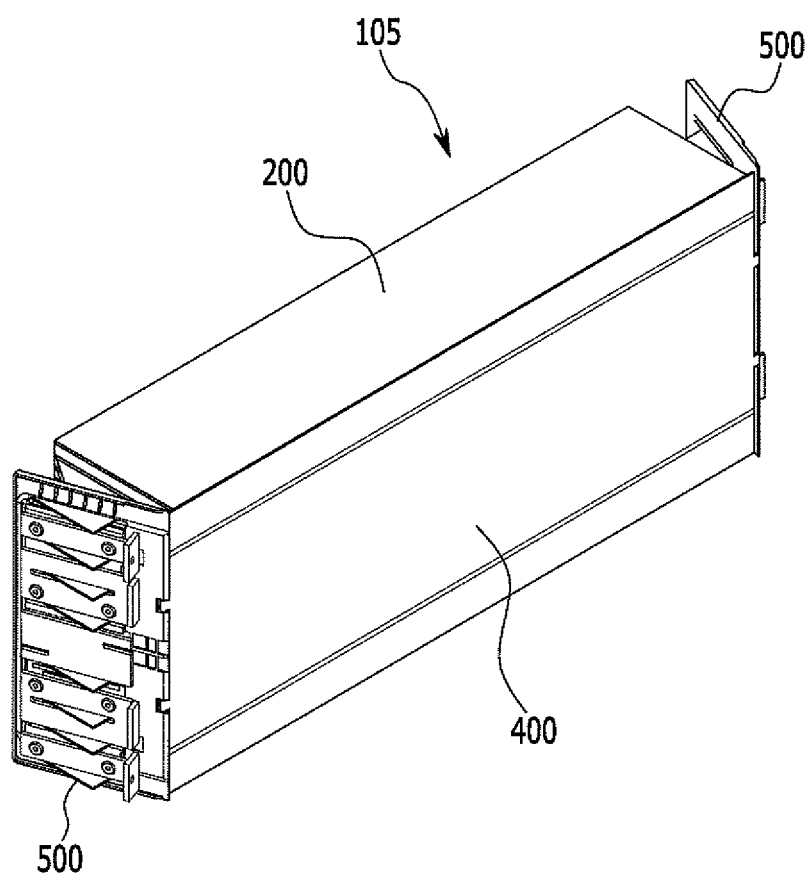

Referring to FIG. 12, the cell lead block 300 of FIG. 11 may be removed in a space between the battery cell stacked body 105 and the bus-bar frame 500.

Figure 13:
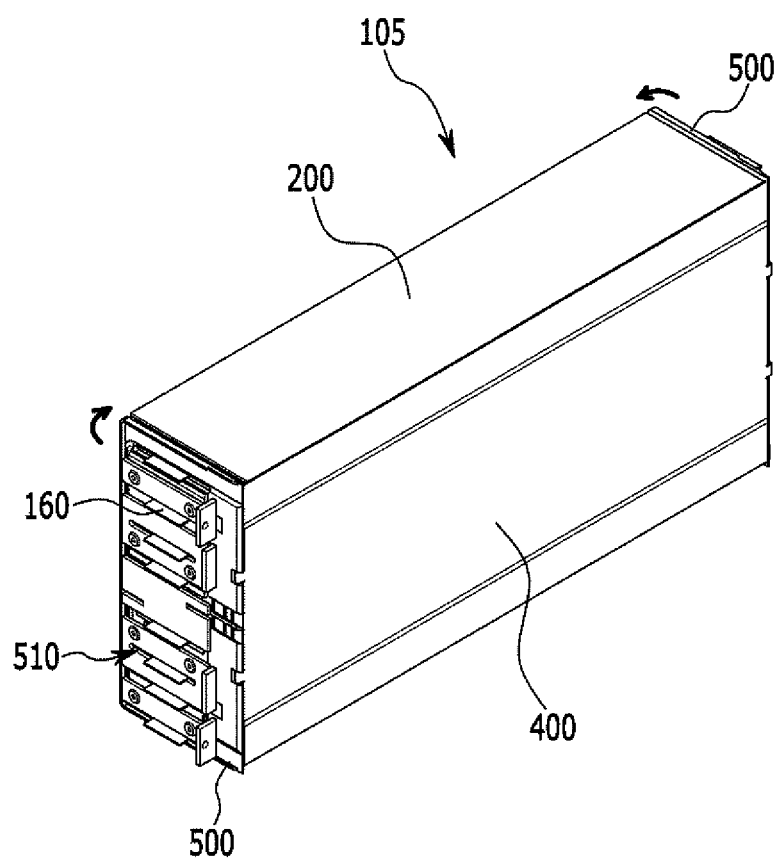

Referring to FIG. 13, the bus-bar frame 500 may be installed in the battery cell stacked body 105 provided between the compression pad 200 by additionally rotating the bus-bar frame 500. In this instance, an end of the electrode lead 160 may be inserted into the lead slot 510 formed in the bus-bar frame 500. The end of the electrode lead 160 may be inserted into the lead slot 510 and may be protruded outside.

Figure 14:
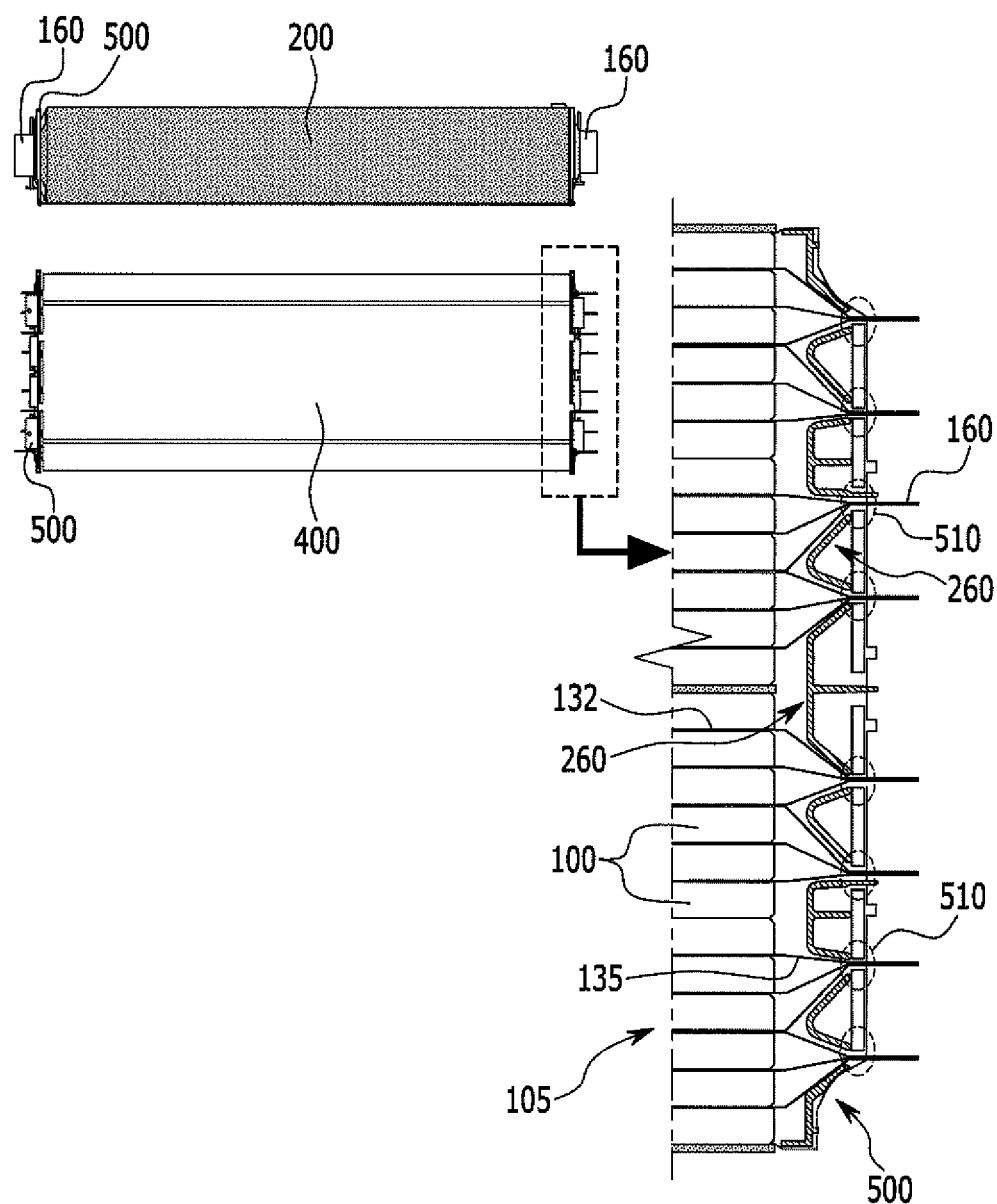

A configuration in which a bus-bar frame 500 is mounted on the battery cell stacked body 105 will now be described in detail with reference to FIG. 14. In FIG. 14, the top left drawing represents a top plan view on the configuration in which the bus-bar frame 500 is installed in the battery cell stacked body 105, the bottom left drawing represents a front view on the configuration, and the right drawing represents an enlarged portion of the front view.

Referring to FIG. 14, a cell terrace 135 in which gaps of electrode leads 160 of a plurality of respective battery cells 100 reduce in the protruding direction is formed. The bus-bar frame 500 includes a path guider 260. The path guider 260 guides the electrode leads 160 to pass through the lead slot 510 before forming a cell terrace 135 in which the electrode leads 160 of the three battery cells 100 extend, and it may be formed on one side of the bus-bar frame 500. In detail, the bus-bar frame 500 may install a path guider 260 inside a rear side of the bus-bar frame 500 separated from the battery cells 100.

The path guider 260 may form a predetermined guide space on the rear side of the bus-bar frame 500 so that three electrode leads 160 and extensions of the case main body 132 including them may be near each other before they pass through the lead slot 510. For this purpose, with reference to XYZ coordinates shown in FIG. 3, a width of the guide space may reduce as a direction goes to the front side (+X-axis direction) of the bus-bar frame 500 having a lead slot 510 from the rear side (−X-axis direction) of the bus-bar frame 500.

Multiple path guiders 260 may be provided. Here, a plurality of path guiders 260 may be provided corresponding to the number of lead slots 510. Accordingly, the adjacent electrode leads 160 from among a plurality of battery cells 100 are paired three by three, and the electrode leads 160 may pass through the lead slot 510 through their path guiders 260 to form the electrode lead 160 group. The number of the electrode leads 160 forming the electrode lead 160 group is not limited to three, and it is modifiable according to the arrangement of the positive and negative electrode leads of the battery cell 100.

Figure 16:
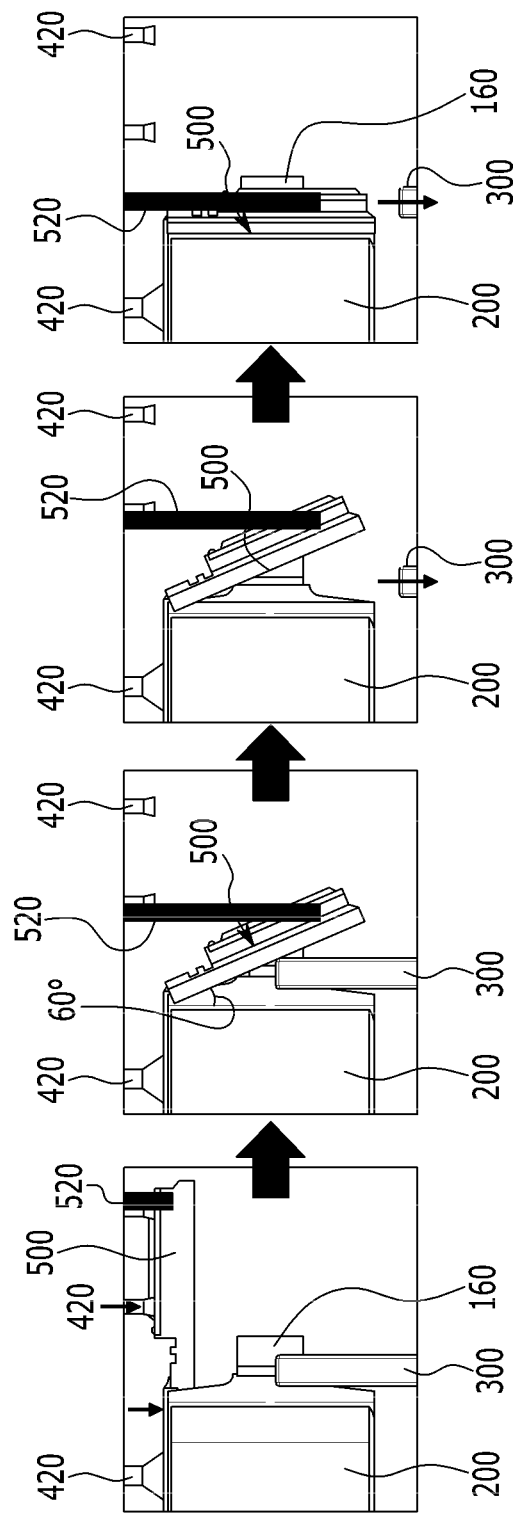
FIG. 16 shows a front view of part of the top plan view of FIG. 15.

FIG. 15 shows a top plan view of a bus-bar frame according to an exemplary embodiment of the present invention. FIG. 16 shows a front view of part of the top plan view of FIG. 15.

Referring to FIG. 15 and FIG. 16, the top cover 400 may be mounted on a side of the battery cell stacked body by using a Cartesian robot. In this instance, pneumatic air on the right and the left of the bus-bar frame 500 may be removed and pneumatic air of the top cover 400 may be maintained. The rotary bar 520 is moved to rotate the bus-bar frame 500 in the range of the acute angle (60 degrees), and the end of the electrode lead 160 may be partly inserted into the lead slot 510 of the bus-bar frame 500. The cell lead block 300 may be moved back from the space between the battery cell stacked body 105 and the bus-bar frame 500. The bus-bar frame 500 may be mounted on the battery cell stacked body 105 by additionally rotating the bus-bar frame 500. In this instance, the rotary bar 520 may move in an oblique direction.

According to the exemplary embodiment of the present invention, the bus-bar frame is assembled in combination with the process for stacking a battery cell, and the Cartesian robot is used, so assembling automation may be realized without the need of an additional bus-bar frame assembling manual.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of mounting a bus-bar frame, comprising:
    forming a battery cell stacked body that has a plurality of cell lead blocks positioned therein by alternately stacking a cell lead block and at least one battery cell such that an electrode lead protruding from each of the at least one battery cell is positioned between adjacent ones of the cell lead blocks;
    disposing a top cover so as to cover the battery cell stacked body, the top cover having opposing ends, each of which includes a bus-bar frame;
    removing the cell lead blocks from a space between the battery cell stacked body and the bus-bar frame; and positioning the bus-bar frame on the battery cell stacked body by rotating the bus-bar frame.

2. The method of claim 1, wherein
a plurality of adjacent electrode leads of a respective plurality of the battery cells form a cell terrace in which gaps between the adjacent electrode leads diminish in a direction in which the electrode leads protrude, and
a shape of the cell terrace conforms to a shape of the cell lead block positioned adjacent to the cell terrace.

3. The method of claim 2, wherein
an impregnation structure is formed on one side of the cell lead block facing the cell terrace, and the cell terrace is disposed in the impregnation structure.

4. The method of claim 1, further comprising
rotating the bus-bar frame by an acute angle before the step of removing the cell lead blocks.

5. The method of claim 4, wherein
the step of positioning the bus-bar frame on the battery cell stacked body includes inserting an electrode lead of the at least one battery cell into a lead slot in the bus-bar frame.

6. The method of claim 1, wherein
the at least one battery cell comprises a plurality of battery cells, and the electrode leads positioned on opposing sides of one of the cell lead blocks have different polarities from one another.

7. The method of claim 6, wherein
a plurality of the electrode leads protruding from respective ones of the battery cells are positioned between the adjacent ones of the cell lead blocks, the plurality of electrode leads defining an electrode lead group.

8. The method of claim 1, wherein
the step of forming the battery cell stacked body includes mounting the cell lead blocks on opposing ends of a compression pad and forming the battery cell stacked body on the compression pad.

9. The method of claim 8, further comprising
positioning a second compression pad on an uppermost battery cell of the battery cell stacked body.

10. The method of claim 9, further comprising
positioning a third compression pad in a central portion of the battery cell stacked body.

* * * * *